July 13, 1965 H. GEBHARDT 3,195,124

CONVERTING PLURAL-ELEMENT INFORMATION

Filed Feb. 12, 1962 4 Sheets-Sheet 2

United States Patent Office 3,195,124
Patented July 13, 1965

3,195,124
CONVERTING PLURAL-ELEMENT INFORMATION
Hartmut Gebhardt, Grosshesselohe, near Munich, Germany, assignor to Siemens & Halske Aktiengesellschaft, Berlin and Munich, a German corporation
Filed Feb. 12, 1962, Ser. No. 172,585
Claims priority, application Germany, Feb. 17, 1961, S 72,586
8 Claims. (Cl. 340—347)

The invention disclosed herein is concerned with the conversion of information consisting of a plurality of individual elements.

It is known to select from a matrix a magnetic core representing the result of a plurality of individual informations. In such procedure, which is among others applied in binary adding and subtracting, there is provided a winding for the transmitter as well as for each of the two values which are to be respectively added or subjected to subtraction. These windings are connected in parallel with a further winding serving for the extension of a timing pulse and with a winding provided for restoring all magnetic cores in the pause between two calculating operations. Such an arrangement is limited with respect to the number of input windings since the tolerances of the individual circuits have to be considered.

There is known a multiple AND circuit, for the conversion of information items with magnetic cores, which operates according to the J/2 principle. In this known solution, however, high demands are made with respect to operation precision involving current and temperature. A reduction of the current in one or in both cases leads to a mutilation of information, since the selected core is only partially demagnetized. Likewise, in the case of excessively great currents a large number of cores ($x+y$ column) are demagnetized, although only one core should be involved. At low or high temperatures there takes place at uniform current, in this known switching arrangement, likewise, either only a partial demagnetization of the result core or a multiple feeding in ($x+y$ column). These changes occasioned by the temperature are due to alternation of the hysteresis loop.

The invention has as its object the development of a switching arrangement for the conversion of a first information item into a second information item with magnetic cores, in which system the current and temperature tolerances in each core compensate themselves. This problem is solved in which, with more than one basis of selection, one core of $m$ cores is selected, whose control lines are collected in groups and in the group the individual writing lines lie in series with selector switches by an arrangement wherein the series switching circuits of these stages lie in series with a blocking wire conducted through all the cores, which wire passes $(x-1)$ time through each core in a direction opposite to that of the writing wires.

Upon closing of the switch there results an individual current circuit running over $x$ writing wires and the blocking wire, which circuit, in consequence of corresponding conduction of the writing wires run through a single one of, for example, $n$ cores $x$ times and in consequence of the counter-excitation through the blocking wires can demagnetize only the one core, to which the second information item is allocated. With a switching arrangement according to the invention the drawbacks of the known arrangement, are eliminated and the current and core tolerances are to a large degree compensated.

Circuit arrangements according to the invention are required, for example, in connection with electronically operating calculating and accounting machines, wherein the input values are to be converted into values with which the machine can operate. An application of such arrangement is however also of advantage in connection with the automatic distribution of mail, wherein a destination criterion is to be formed, for example, from a plurality of characters selected according to a given principle from the name of a place of destination of given items.

It may however happen that a second information cannot be definitely obtained, based upon the input of a first information. This is, for example, the case in connection with a booking machine for air travel involving routes which are serviced by several air lines. In accordance with another feature of the invention, there is provided an auxiliary readout wire upon all magnet cores to which no definite result is assigned. All these readout wires are serially circuited and extended to a control readout amplifier. The output impulse of this control readout amplifier indicates at an operator position the request for a supplemental input, stores the result so far obtained, and prepares the circuit arrangement of the receipt of an auxiliary criterion. Accordingly, it will be necessary to supply only as many informations as are as a rule required for obtaining a definite result and to indicate the need for further information only when it is required.

Further features of the invention are defined in the appended claims and will be brought out in the description which will be rendered below with reference to the accompanying drawings which illustrate the invention in connection with an example of an embodiment of a converter for mail distributing installation.

Figure 3:
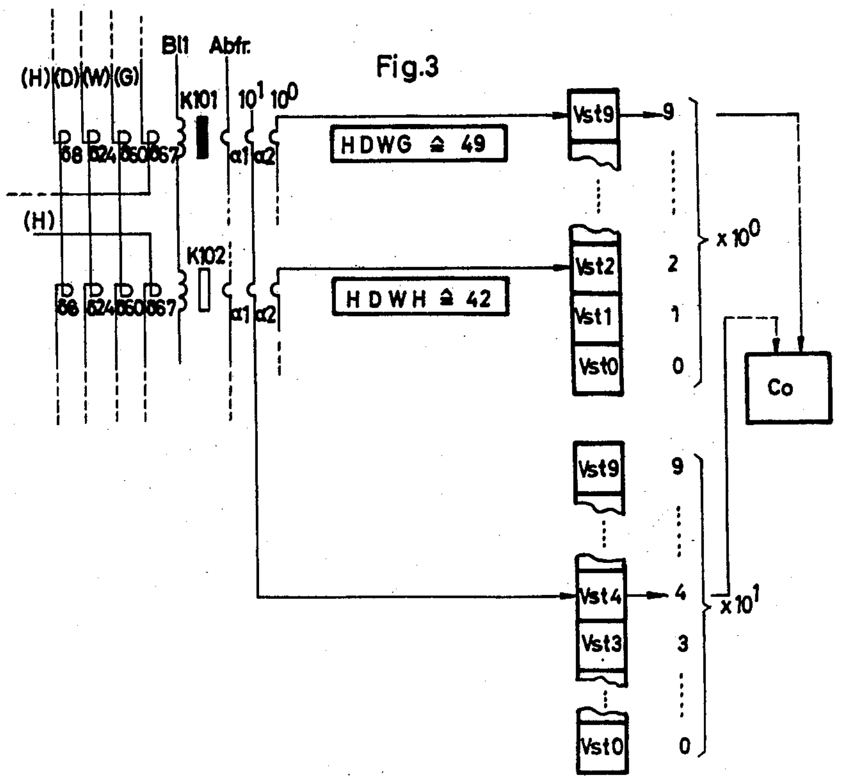
Figure 4:
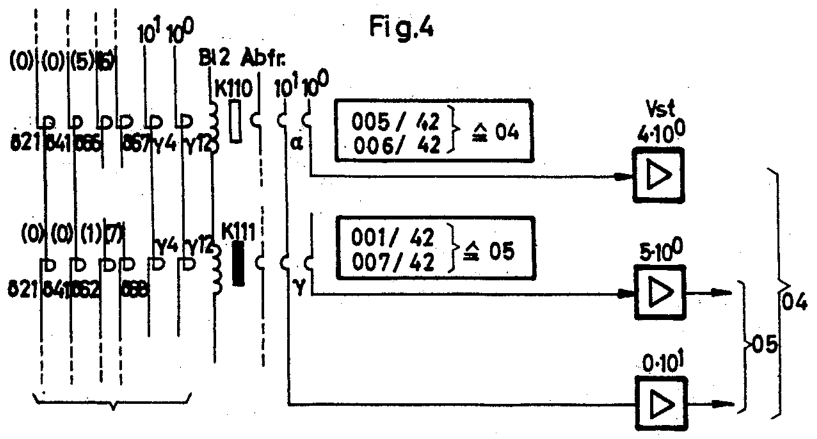
Figure 5:
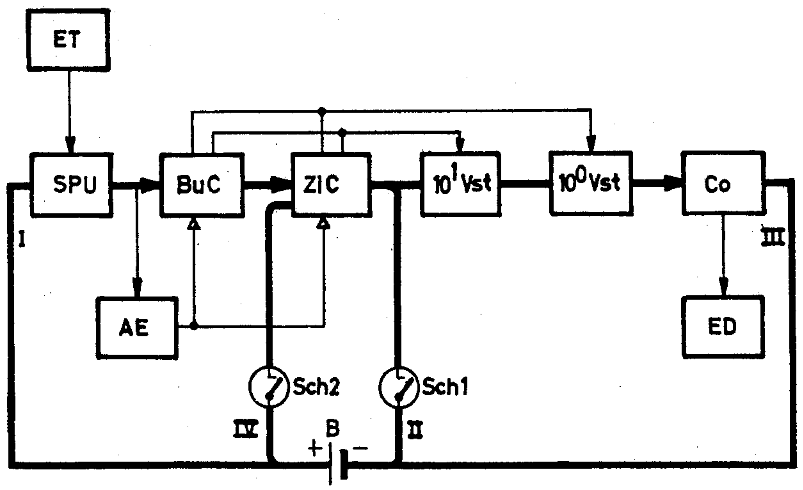

FIG. 3 indicates the character encoding field with successively disposed amplifier groups;

FIG. 4 illustrates the numeral encoding field with successively disposed amplifier groups; and FIG. 5 is a block circuit diagram of the arrangement.

The converter underlying the illustrated embodiment is assumed to be connected to an individual encoding station or position for the purpose of ascertaining criteria for incoming mail. It is thereby necessary to produce a code from a given selection of characters included in a street designation, such code corresponding to the mail man who delivers the mail. However, since there are streets which are serviced by several mail men, the house numbers must also be supplied so as to obtain definite unequivocal results. The operating principles of the converter will therefore be explained in connection with an example of the encoding of a street which is located within the delivery area of a single mail man, and also in connection with an example of the encoding of a street which is located within the delivery areas of several mail men.

The representation appearing in the drawings shall first be briefly discussed before explaining the operation of the installation.

Figure 1:
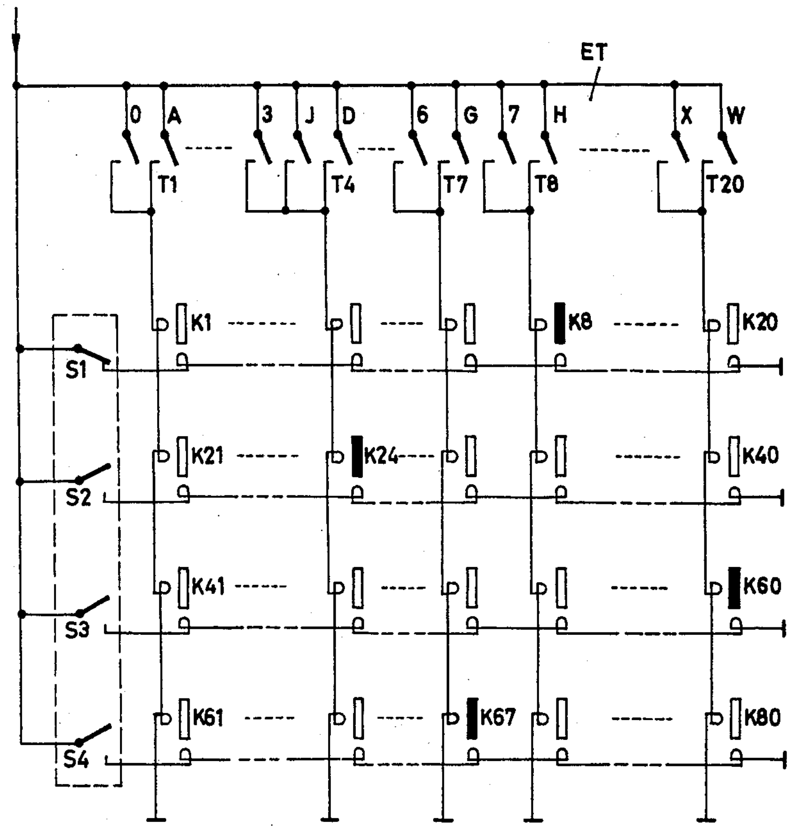
FIG. 1 shows the arrangement of a storage matrix of a series-parallel converter.

The entry of the individual information is effected with the aid of a key board ET (FIG. 1) comprising contacts T1 to T20. In order to simplify the equipment, the series-parallel converter has been designed for character encoding as well as for number encoding, resulting in the parallel connection of the contacts of the entry keys as shown in FIG. 1. The key for the character A is associated with the key for the number 0 and the character key D is similarly associated with the number key 3. The character key J is additionally connected in parallel with the character key D since only twenty contact combinations are used for forming the character combination from the twenty six characters of the alphabet, thus requiring combining of the excess characters with other characters. For example, the character key D is in this manner placed together with the character J and the character W is placed together with the character X. The same converter serves for the characters as well as for the numbers, and the same reading amplifiers serve likewise for the character- as well as for the number-encoding field.

The core matrix shown in FIG. 1 comprises four lines or rows and twenty columns and a four-stage electronic stepping device having the switching stages S1–S4. Each of the cores K1–K80 is operatively connected to switches, for example, electronic switches such as transistors, in which case each of the cores may carry the base winding of a respectively cooperatively disposed switching transistor, the corresponding arrangement being indicated in FIG. 2.

One side of each of the twenty switches, for example, the emitters of switching transistors of the first row lie on the positive terminal of a current source B while the other side thereof, such as the collectors are connected, over the encoding-field writing wires δ1–δ20, with each one side of the twenty switches, for example, the emitters of the switching transistors of the second row. The switches of the second row are likewise connected, over the encoding-field writing wires δ21–δ40, with the twenty switches of the third row. The transition from the third to the fourth row follows the same scheme. The switching circuit extends from the fourth row, with its encoding-field writing wires δ61–δ80, over the blocking wires B*l*1, B*l*2 and the impulse switch S*ch*1 to the negative terminal of the current source B.

Figure 2:
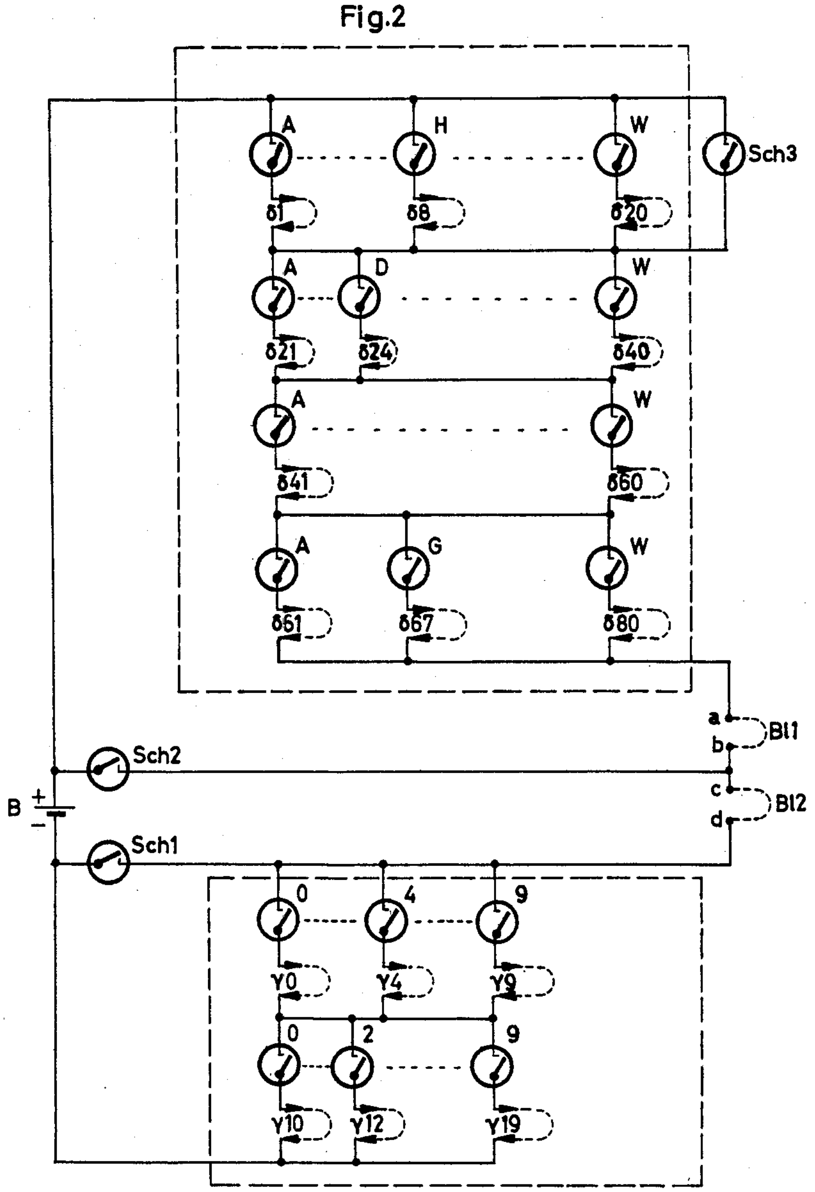
FIG. 2 represents the switches with the encoding writing wires $\delta$ and $\gamma$ a nd the blocking wires B1.

The switches of the reading amplifier, for example, also switching transistors, with their writing cores γ are indicated within the dash line rectangle in the bottom part of FIG. 2.

FIG. 3 shows in schematic manner the character encoding field B*u*C. To each combination result is in this field assigned a magnet core which triggers the end result. The magnetization of this core is in the present example changed to the "1" condition only when four writing wires assigned to this character act on the core, each with +1J change of magnetization current. A blocking wire B*l*1 acting at the writing instant with −3J on each core of the encoding field prevents change of magnetization of a core unless all four writing terms are effective.

The cores of the character encoding field carry in addition to the writing wires δ and the blocking wire B*l*1, a readout wire A*bfr* and two sensing or reading wires α.

All sensing or reading wires α of the same number of a tens power are in the encoding field serially connected and extended to one of the 2×10 sensing or reading amplifiers the output of which is characteristic for the respective number. The end result is extended to an encoder C*o*.

The number encoding field Z*i*C shown in FIG. 4 is constructed similarly as the character encoding field B*u*C. To each switching core are assigned four sensing or reading wires δ, two writing wires γ, a blocking wire B*l*2, a readout wire *Abfr*, and two sensing or reading wires α. The sensing or reading wires are here likewise serially disposed and extend to reading amplifiers V*st*.

The arrangement according to the invention shall ascertain, from four characters successively fed thereto, which are taken from street names, the number of a mail man, in the present case a number from 1 to 96, who delivers mail within an area which includes the addressee of a mailed item. The number which is ascertained by the conversion is printed on the respective mailed item, for example, in coded form, with magnetic ink, and such item, for example, a letter, is fed to a letter sorting machine which in turn feeds the letter according to the printed information to the container reserved for the mail man who delivers mail in the respective territory.

The operation of the arrangement according to the present invention shall first be explained in connection with the coding of a street which is located in the delivery territory of a single mail man. The street name "Hedwig Street" shall serve as a coding example, the code characters selected from this street name being assumed to be the characters HDWG. The street involved is located within the delivery territory of a mail man to whom is assigned the number 49.

The switch S1 (FIG. 1) is at the start of an input cycle always closed, while the switches S2–S4 are open. The four characters are by a code operator successively keyed in the keyboard ET. Depression of the key H closes the contact T8, thereby causing the writing wire extending from the contact T8 jointly with the writing wire extending from the switch S1, to change the magnetization of the core K8, according to the J/2-principle, to the "1"-condition. After keying the first character (H), the switch S1 is opened and switch S2 is closed, and the core K24 is placed into the "1"-condition responsive to depression of the key D denoted by the second character D. The magnetization of the core K60 is thereupon similarly changed responsive to the keying of the third character W by means of the key W. Keying of the fourth character G of this input cycle, by means of the key G places the core K67 into the "1" condition. Four of the cores, one core in each row or line of the core matrix are in this manner marked, such marked cores being indicated in solid black so as to recognize them at a glance. This marking may be referred to as the first information which is to be converted into a second information in the manner described below.

The input writing operation in the character encoding field B*u*C (FIG. 3) is initiated upon effecting change of magnetization of the cores K8, K24, K60 and K67 (FIG. 1) into the "1"-condition, thereby concluding the series input feeding of the characters HDWG into the matrix. All of the cores of the matrix are now read out. Only the cores which had been placed into the "1"-condition will upon restoration thereof into the "0"-condition supply a voltage, over their respective base windings, to the bases of switching transistors respectively assigned thereto (FIG. 2) whereby one switching transistor per line becomes conductive, thus connecting through, for a few milliseconds, a circuit over the writing wires δ8, δ24, δ60, δ67 in the character encoding field (FIG. 3), such circuit being characteristic for the character combination HDWG and extending over the switching transistor S*ch*1 (FIG. 2). This circuit affects all cores in the encoding field, the character combination of which has in the first place an H, in the second place a D, in the third place a W, and in the fourth place a G. Only one of the many cores which are affected in this circuit contains all four input terms, namely, the core K101 (FIG. 3), and such core is accordingly changed in magnetization while all other cores, for example, the core K102, cannot be changed in magnetization, into the "1"-condition owing to the effect exerted by the blocking wire B*l*1.

As is apparent from FIG. 2, the activated writing wires are over their switching transistors serially connected and are always included in the same circuit with the blocking wire B/1 which is disposed between the points *a* and *b*.

Upon reading out the core K101 which is in the assumed example operatively affected, there is produced a reading voltage in the reading wires α1 and α2, which voltage is amplified by the amplifier of the order $4\times10^1$ and by the amplifier of the order $9\times10^0$. Each of the amplified reading signals magnetizes a storage core (not shown), which is respectively assigned to each reading amplifier, into the "1"-condition. There is thus obtained the decimal result, namely, the number 49 in the form of marked cores respectively in two of the twenty reading amplifiers V*st*, representing the second information.

The next timing impulse effects closure of the switch S*ch*2. The reading out of the cores of the reading amplifier, each of which cores carries a base winding of a switching transistor, form a circuit extending over the switch S*ch*2, the blocking wire B*l*2, and one respective switching transistor of a reading amplifier group and the writing wires assigned thereto. These two writing wires convert the decimal result in the encoder C*o* (FIG. 5) into a code, for example, the 2- from 5-element code, from which the message is extended, for example, to the printing mechanism ED (FIG. 5) for actuating the printing magnet thereof. The message or mail man number is now printed on the involved postal item which is thereafter routed to the proper receptacle.

However, if the address noted on a postal item indicates a street along which mail is delivered by two or more mail men, it will be necessary to include in the keying of the input information the house number, so as to determine the proper mail man. The address "Bahnhofsplatz No. 7" shall serve as an encoding example. The four characteristic characters selected from the address are the characters BHNP. It is assumed that the mail for this location is delivered by two mail men and that one of the respective delivery areas, including the house numbers 1 and 7, is designated by the number 04, while the other delivery area, including the house numbers 5 and 6, is designated by the number 05.

The encoding operation starts in this case again with keying the characters BHNP into the series-parallel converter. The information stored in the converter is simultaneously read out, again making four switching transistors conductive, such transistors being with the aid of their writing wires, the blocking wire and the switch *Sch1* (FIG. 2) effective to change in the character encoding field the magnetization of the magnetic core assigned to the character combination, to place such core into the "1"-condition.

Upon reading out the character encoding field, one of the marked cores will upon change of magnetization into the "0"-condition deliver reading voltages to its two reading wires, which voltages are conducted to the reading amplifiers. The reading amplifiers comprise, as noted before, an amplifying stage as well as a core-transistor combination connected thereto, the magnetization of the core of which is changed to the "1"-condition responsive to receipt of a reading signal at the amplifier input. Proceeding in accordance with the previously explained case, the stored information would be released again responsive to the next timing pulse, making the switching transistors, assigned to the storage core conductive, thereby activating two writing wires in the encoding field or board so as to effect the release of the result.

In the case which is now being considered, with release of information from the amplifiers is suppressed by a control impulse. The control impulse is produced by the provision of an auxiliary reading wire on all cores in the character encoding field, the character combination of which, which is assigned thereto, cannot form a definite and unequivocal result without an additional house number fed into the equipment. All these reading wires are serially related and are extended to a control reading amplifier. The output impulse from this control amplifier effects the three following operations, namely (a) a signal is given to the coding desk or position which signifies a demand for a house number input; (b) the release of information contained in the reading amplifiers is prevented, such information representing an intermediate result which was arbitrarily assumed to include two numbers; and (c) the series-parallel converter is prepared for the receipt of the house number input. The switch *Sch3* (FIG. 2) is closed. The electronic stepping device is brought from the initial position into the first operating position (FIG. 1), in which the switch S1 is opened and switch S2 is closed. This is necessary in order to permit using the same series-parallel converter for the receipt of house numbers. The house number is in the assumed example always fed in as a three place number, thus making it possible to release without actuation of a start key the encoding operation automatically after keying the third number. In the event that the house number consists of a single digit or of a two digit number, two zeroes or one zero must respectively be added to complete the three places.

The $10^2$-number of the house number is according to its quantum fed into one of the first ten columns of the second row or line of the converter (FIG. 1). The $10^1$-number or digit of the house number is stored in the third row and the $10^0$-number or digit reaches with the aid of the stepping device the fourth row.

The writing operation is released when one core in the second, third and fourth row of the series-parallel converted is marked and when the intermediate result has been stored in two cores of the reading amplifier. All of the cores of the converter as well as the cores of the $10^1$- and $10^0$-reading amplifier groups are now read out. The transistors, the cores of which contained the message "1" now become conductive owing to the action of the base winding on each core respectively assigned to a switching transistor and the voltage produced in the respective base windings upon change of magnetization of the corresponding cores. A circuit is produced (FIG. 2) which extends over the switch *Sch3* and three switching transistors of the converter which are characteristic of the supplied house number, and over the writing wires $\delta$ and the blocking wires *Bl1* and *Bl2* as well as over two switching transistors of the reading amplifiers and their writing wires $\gamma$ to the negative terminal of the current source. The activated writing wires $\gamma$ are thereby characteristic for the intermediate result. These five +J-terms $(3\delta+2\gamma)$ act jointly, with a term operating with −4J, on the blocking wire *Bl2* (FIG. 4) of all cores of the number encoding field. Only one core K111 of the number encoding field, to which are assigned all five terms in the form of writing currents, is changed in magnetization to the "1"-condition.

It shall be assumed that the intermediate result "42" was formed with the aid of the combination BHNP. This means, that the core of the reading amplifier with the order $4\times10^1$ and also the amplifier wtih the order $2\times10^0$ contain the message "1." The house number 007 was thereafter fed to the converter. Upon simultaneous readout of the cores of the converter and of the reading amplifier, five switching transistors will become conductive by the action of the encoding field writing wires $\delta21$, $\delta41$, $\delta63$ as well as $\gamma4$ and $\gamma12$. They jointly affect in the number coding field, the core K111 (FIG. 4) and four of these writing wires affect, for example, the core K110. The core K110 represents with its two reading wires the result 04 while the core K111 represents the result 05. Which of the two cores is now magnetized into the "1"-condition will depend upon the writing wires $\delta$ which had been determined by the digits of the house number while the writing wire $\gamma$—determined by the intermediate result—have predetermined the cores K110 and K111 from a multitude of cores of the number encoding field. In the assumed example, the house number 007 activated the wires $\delta21$ (number $0.10^2$), $\delta41$ (number $0.10^1$), and $\delta63$ (number $7.10^0$). According to FIG. 2, all writing wires are serially related, including the blocking wire *Bl2*, and therefore carry at the same time identical current. The core K111 is changed in magnetization to the "1"-condition while the core K110 remains in the "0"-condition. This effects the elimination, and upon readout of the number encoding field, the core K111 is again placed into the "0"-condition, whereby the voltage occurring in the reading wires triggers the reading amplifiers $0\times10^1$ and $5\times10^0$. The switch *Sch2* (FIG. 2) is closed incident to the next timing pulse. The result formation is effected as already described, by reading out the cores of the reading amplifier.

The writing wires $\delta$ of the converter extend through the character encoder as well as through the number encoder. The blocking wires are likewise disposed in serial relationship. A maximum of four writing wires can be activated in the character encoding during the writing operation, which may lead in the character encoding field, with the blocking wire *Bl1* which is effective with −3J, to a change of magnetization of a core into the "1"-condition. In the number encoding field there act this instant at a maximum only three of the four activated writing wires, since no wire extends from the first row of the converter (FIG. 2) into the number encoding field, because there is no house number with a $10^3$-digit. No feeding-in can occur during the character encoding in the number encoding field, since the blocking wire B*l*2 in the number encoder is effective with —4J.

On the other hand, a feeding-in operation cannot occur in a number encoding operation in the cores of the character encoding field, because there are in such case only three activated writing wires each carrying +1J which reach the encoding field from the converter, so that the blocking wire B/1 acting with —3J on all cores of the character encoding field prevents a feeding-in. However, in the number or digit encoding field, there must be considered in addition to the 3×(+1J7) 2×(+1J7) from the writing wires of the switching transistors of the reading amplifier so that the blocking wire B*l*2 which is active with —4J can not prevent the feeding-in in one core.

Accordingly, all reading wires of both encoding fields can be serially connected with the same digit of a tens power and extended to a common amplifier with 1-bit storer and switching transistor connected thereto.

Upon considering the writing circuits formed in the respective working phases (FIG. 5), it will be seen that the circuit in the character encoding extends from the point I over the series-parallel converter SPU, the character encoding field B*u*C and the number encoding field Z*i*C, with its writing and blocking wires, over the switch S*ch*1 to the point II.

In the number encoding, the current from the point I also reaches the point III over the series-parallel converter SPU, the character- and the digit-encoding fields B*u*C, Z*i*C and the two amplifier groups $10^1$V*st* and $10^0$V*st*, with their writing wires, and for the encoding field C*o*. The encoding field is during this phase blocked by an activated blocking wire which affects all cores of this encoding field so that the intermediate result cannot be fed in.

When the decimal result is given off to the encoding device, the current will be conducted from the point IV over the switch S*ch*2 to the blocking wire B*l*2 of the digit encoding field and from there over the amplifier groups to the point III. The switching in of the blocking wire B*l*2 is necessary since the writing wires of the reading amplifier extend into the encoding field and also to the intermediate result release in the digit encoding field. The blocking wire B*l*2 prevents in the final result release a feeding-in to the digit encoding field.

Changes may be made within the scope and spirit of the appended claims which define what is believed to be new and desired to have protected by Letters Patent.

I claim:

1. A circuit arrangement for converting a first information which is represented by the activation respectively of one of *m* elements in *x* groups, whereby *m* may vary from group to group, into a second information which is represented by the magnetization of one of *n* magnet cores disposed in a field of cores having wires extending therethrough, a plurality of said wires passing through the respective cores, comprising means forming *x* stages corresponding to the *x* groups, each stage comprising switches connected in parallel relationship, said switches provided respectively with serially disposed writing wires, the switches of the respective stages being respectively assigned to the *m* elements of the corresponding group of the first information and being operatively closed upon activation of the corresponding element, the series circuit of said stages being disposed in series with a blocking wire extending through all cores, said blocking wire passing ($x$—1) times through each core in a direction opposite to the direction of the writing wires, whereby an individual current circuit is formed responsive to closure of a switch, which circuit extends over *x* writing wires and the blocking wire, said individual circuit passing *x*-times only through one of the *n* cores and being owing to opposing energization effected by said blocking wires operative to change the magnetization of only such core to which is assigned the second information.

2. A circuit arrangement according to claim 1, wherein transistors constitute said switches.

3. A circuit arrangement according to claim 1, comprising an auxiliary sensing wire provided for each magnet core assigned to the second information, which core has no definite result assigned thereto, a signal therefrom signifying that an additional information item is required.

4. A circuit arrangement according to claim 1, wherein *x* groups of a first information form in a first core arrangement a second information, identical *x* groups being combined with *k* further groups to form, as a third information, in a second core arrangement a fourth information, said two core arrangements distinguishing from one another by premagnetization of different strength.

5. A circuit arrangement according to claim 1, wherein each magnet core which represents the second information has assigned thereto the following wires, namely, *x* writing wires, a blocking wire acting on such core only at the writing instant with ($x$—1)J change of magnetization current, a readout wire, and a reading wire.

6. A circuit arrangement according to claim 5, wherein the sensing wires for terms of identical magnitude are serially connected and conducted to sensing amplifiers comprising respectively an amplifier stage and a core-transistor combination connected therewith.

7. A circuit arrangement according to claim 6, comprising an encoder, the writing wires of said sensing amplifier group being effective to convert in said encoder the final result to form a predetermined code, and a printer for receiving said code.

8. A circuit arrangement according to claim 1, comprising an auxiliary sensing wire provided for each magnet core assigned to the second information, which core has no definite result assigned thereto, said auxiliary sensing wires being serially disposed and conducted to a control-sensing amplifier, the output impulse of said control-sensing amplifier indicating, first, a request for the input of supplemental information, second, causing storage of the present information, and, third, preparing the circuit arrangement for the receipt of a supplemental criterion for completing the present intermediate result.

References Cited by the Examiner

UNITED STATES PATENTS

| | | | |
|---|---|---|---|
| 2,843,838 | 7/58 | Abbott | 340—347 |
| 2,912,679 | 11/59 | Bonorden | 340—347 |
| 2,973,506 | 2/61 | Newby | 340—347 |
| 3,011,165 | 11/61 | Angel et al. | 340—347 |
| 3,013,251 | 12/61 | Wright | 340—347 |

MALCOLM A. MORRISON, *Primary Examiner.*